(12) United States Patent
Verbecque et al.

(10) Patent No.: US 7,050,364 B2
(45) Date of Patent: May 23, 2006

(54) OPTICAL SCANNING DEVICE

(75) Inventors: Rene Verbecque, Eindhoven (NL); Petrus Theodorus Jutte, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 358 days.

(21) Appl. No.: 10/213,423

(22) Filed: Aug. 6, 2002

(65) Prior Publication Data

US 2003/0048703 A1 Mar. 13, 2003

(30) Foreign Application Priority Data

Aug. 10, 2001 (EP) .................................. 01203059

(51) Int. Cl.
*G11B 7/95* (2006.01)

(52) U.S. Cl. ................................. 369/44.23; 369/112.1

(58) Field of Classification Search ............ 369/44.14, 369/44.23, 44.21, 112.01, 112.13, 112.15, 369/112.17, 112.23, 112.26, 112.1
See application file for complete search history.

(56) References Cited

U.S. PATENT DOCUMENTS

| | | | |
|---|---|---|---|
| 5,657,303 A * | 8/1997 | Namoto et al. .......... | 369/44.32 |
| 6,069,862 A | 5/2000 | Fujita et al. ................ | 369/112 |
| 6,243,337 B1 * | 6/2001 | Miyanabe et al. ....... | 369/44.32 |
| 6,275,461 B1 * | 8/2001 | Yoo et al. .............. | 369/112.01 |
| 6,370,103 B1 * | 4/2002 | Yamazaki et al. ..... | 369/112.26 |
| 6,650,613 B1 * | 11/2003 | Jutte et al. ............. | 369/112.17 |

OTHER PUBLICATIONS

Patent Abstracts of Japan, Fukui Yukio: "Optical Pickup And Optical Disk Device" Publication No. 10222865, Aug. 21, 1998, Application No. 09024785, Feb. 7, 1997.

* cited by examiner

*Primary Examiner*—W. R. Young
*Assistant Examiner*—Van Pham
(74) *Attorney, Agent, or Firm*—Michael E. Belk

(57) ABSTRACT

An optical pickup unit for scanning an optical disk includes a first optical branch including a first radiation source for emitting a first radiation beam of a first wavelength, and a dichroic mirror (8) located in the path of the first radiation beam for reflecting the first beam towards the disk, and a second optical branch including a second radiation source for emitting a second radiation beam of a second wavelength, different to said first wavelength, and a folding mirror (28) located in the path of the second radiation beam for reflecting the second beam towards the disk. The first and second branches are stacked in the axial direction of the disk, and are arranged substantially perpendicularly when viewed along the axial direction.

16 Claims, 3 Drawing Sheets

OPTICAL SCANNING DEVICE

This invention relates to an optical unit for use in optical scanning devices for scanning an optical disk, such as an optical disk, including at least one information layer. The unit includes a plurality of radiation sources for generating a plurality of radiation beams of different wavelengths.

Optical pickup units for use in optical scanning devices are known. The optical pickup units are mounted on a linear bearing for radially scanning across the tracks of the optical disk. The size of the optical pickup unit is preferably reduced as much as practicable, in order to reduce the size and complexity of the radial tracking mechanism and to allow additional space for other components being mounted in the scanning device.

At the same time, there is a desire to achieve a low-cost solution allowing the efficient manufacture of the device and its components in high volumes. When manufacturing components in high volumes, a key factor is the stability and reproducibility of the manufacturing process. If a process is unstable or difficult to reproduce, it has a significant effect on the final cost.

In accordance with one embodiment of the invention, there is provided An optical unit for scanning an optical disk using radiation beams directed in a direction axial of said disk when said disk is arranged in a substantially planar scanning area adjacent the unit, the unit comprising: a first optical branch including a first radiation source for emitting a first radiation beam comprising a first wavelength, and a first reflective element located in the path of the first radiation beam for reflecting the first beam towards said scanning area in said axial direction, the unit being arranged such that said first beam is directed along a first linear optical path portion when incident from said first radiation source upon said first reflective element; and a second optical branch including a second radiation source for emitting a second radiation beam comprising a second wavelength, different to said first wavelength, and a second reflective element located in the path of the second radiation beam for reflecting the second beam towards said scanning area in said axial direction, the unit being arranged such that said second beam is directed along a second linear optical path portion when incident from said second radiation source upon said second reflective element, wherein said first reflective element is arranged between said second reflective element and said scanning area such that said first and second branches are stacked in said axial direction, and wherein said first and second optical path portions are arranged substantially perpendicularly when viewed along said axial direction.

By use of an axially stacked arrangement, the dimensions of the optical pickup unit, in particular its length and width (perpendicular to the axial direction), referred to as the unit's footprint, may be reduced significantly. This provides the advantage of increasing space in the recording and/or playback device in which the OPU is mounted, and to improve access to the components of the device. Furthermore, by arranging the two optical path portions substantially perpendicularly, the alignment of optical components in the unit, which is a key part of the manufacturing process, to bring the interworking optical components into alignment within predetermined tolerances, can be performed in a relatively efficient manner, since alignment can be performed using two mutually perpendicular alignment referencing systems. Furthermore, any required realignment of components in one branch can be performed substantially independently of any required realignment of the components of the other branch.

Furthermore, arranging the components substantially mutually perpendicularly provides additional space, adjacent the second optical path portion for the location of a tilt sensing device in the unit, whist maintaining a relatively small footprint for the device.

Preferably, the two branches are arranged with their optical axes in two planar layers spaced in the axial direction. Arranging each of the branches in a planar layer keeps the axial depth of the OPU relatively small.

In a preferred embodiment, one or more of the optical components of each of the two branches are arranged in two separate housings, made for example of moulded metal such as aluminium, which are mounted together during manufacture. This provides modularity of the system, namely one housing may be independently modified or replaced without requiring the re-engineering of the entire OPU housing, which can be a time-consuming and costly process.

It is noted that an optical pickup unit, the Panasonic DVD RAM drive LF-D100J, includes two axially stacked branches. However, in that OPU the two branches are arranged substantially parallel to one another, which provides various drawbacks including inaccessibility of both branches, difficulty in achieving optical alignment of both branches during the manufacturing spaces, and a relatively large footprint when a tilt sensor in included in the OPU. The present invention may be employed to overcome these drawbacks.

Embodiments of the invention will now be described, by way of example only, with reference to the following drawings, wherein.

In accordance with embodiments of the invention, different formats of optical recording medium including read-only optical disks, such as CD (Compact Disk), and DVD (Digital Versatile Disk); and recordable optical disks, such as a CD-R (Compact Disk–Recordable), CD-RW (Compact Disk–Rewritable) and DVD+RW (Digital Versatile Disk+Rewritable) may be written and/or read-out by means of the optical pickup unit (OPU). The optical components of the OPU are held in a rigid housing which is formed of moulded aluminium or suchlike. The OPU is arranged in an optical recording and/or playback device such that the OPU travels along a linear bearing arranged radially of the disk during scanning of the disk. Each disk to be scanned is located in a planar scanning area adjacent to the OPU, mounted on a motorised rotating bearing in the playback and/or recording device, whereby the disk is moved relative to the OPU during playback and/or writing.

Each of the different formats of disk to be scanned by the device includes at least one information layer. Information may be stored in the information layer or layers of the optical disk in the form of optically detectable marks arranged in substantially parallel, concentric or spiral tracks. The marks may be in any optically readable form, for example in the form of pits or areas with a reflection coefficient different from their surroundings. In the case of the recordable disks, the information layer or layers are formed of an optically recordable material, for example a radiation-sensitive dye as used in the CD-R format, or a phase change material as used in the DVD+RW format, which requires a relatively high power for rewriting the disk, compared to that required for data read-out.

The OPU includes two optical branches for scanning disks with radiation of two different wavelengths, in this embodiment a wavelength of approximately 780 nm (referred to herein as "the CD wavelength") and a wavelength of approximately 650 nm (referred to herein as "the DVD wavelength"). It should however be appreciated that optical scanning devices in accordance with different embodiments of the invention may operate at other wavelengths, and with more than two wavelengths.

Figure 1:
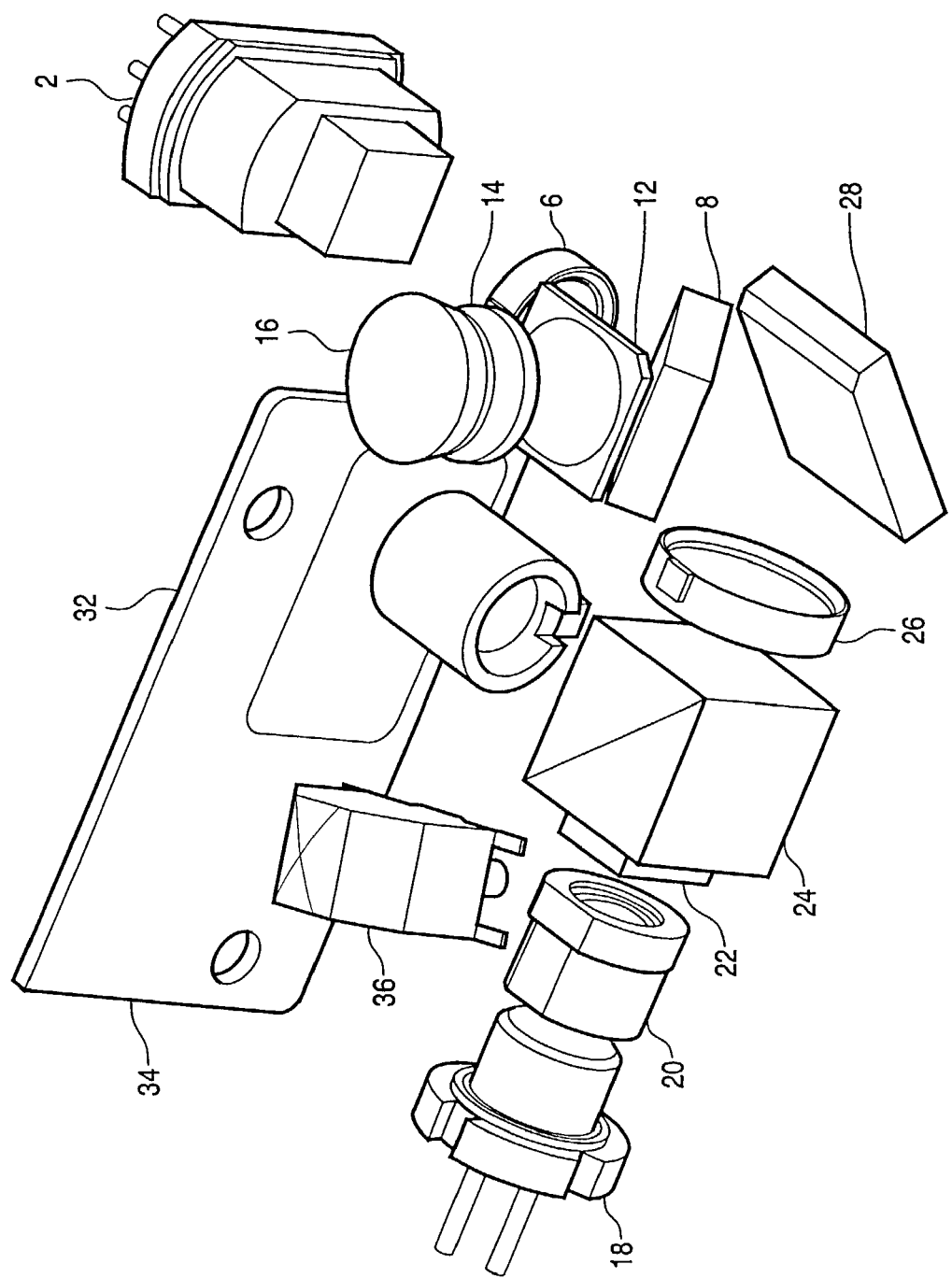
FIG. 1 is a perspective view of elements of an optical unit in accordance with a first embodiment of the invention.
Figure 2:
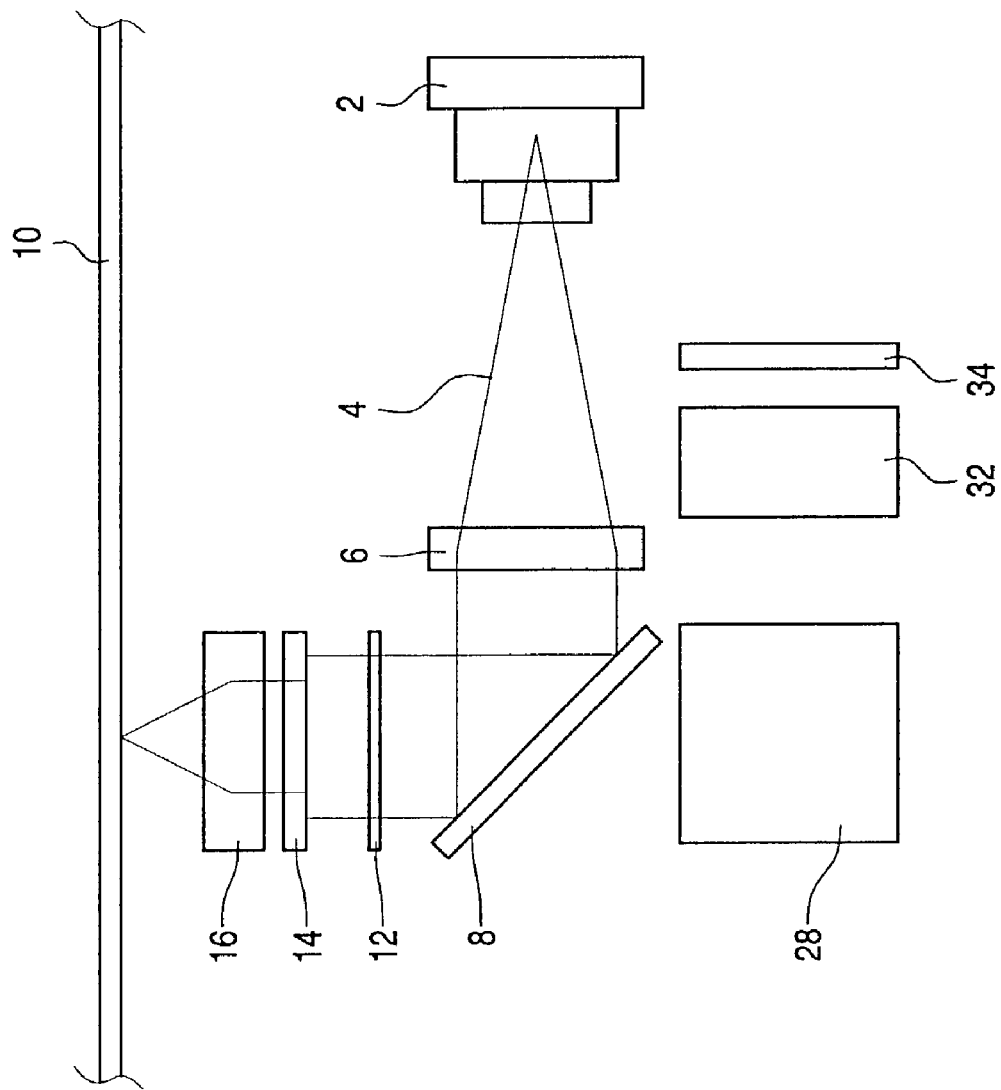
FIG. 2 is a schematic side view of the optical unit shown in FIG. 1.

Reference is now made to FIGS. 1 and 2. The first optical branch, which is arranged in a planar layer parallel to the optical disk scanning area, in this embodiment comprises a Laser Detector Grating Unit (LDGU) 2 which includes a polarised radiation source, for example a semiconductor laser, operating at a predetermined wavelength, in this example the CD wavelength, to produce a first beam 4; a photodiode detector array for detecting a data signal and focus and radial tracking error signals in the first beam reflected from the optical disk; and a holographic grating for splitting the beam for the focus and radial tracking error signal generation. The LDGU 2 emits a diverging radiation beam 4. The first branch further includes, arranged along a first linear optical path portion along with the LDGU, a collimator lens 6 for producing a more collimated beam, nevertheless slightly non parallel so as to compensate for spherical aberrations generated by a transparent layer in the disk, and a dichroic beam splitter 8 for folding the first beam through 90° to be directed in the axial direction of the optical disk 10 and towards the optical disk 10 and the reflected first beam towards the detector of the LDGU 2. The optical disk 10 is one designed for readout and/or writing at the CD wavelength.

In the optical path portion between the beam splitter 8 and the optical disk 10, which portion is shared by the two radiation beams of the device, lie a quarter wavelength plate 12, operative at the DVD wavelength, a dichroic aperture, operative to reflect radiation at the CD wavelength in an area outside a predetermined radial distance from the optical axis, and a dual beam objective lens 16. The dual beam objective lens may be one of a number of different types of lens, whether a compound or single lens, for correctly focusing, with limited spherical aberration, the collimated CD wavelength beam to a spot on the information layer in the disk operative at the CD wavelength, and a collimated DVD wavelength beam to a spot on an information layer in a disk operative at the DVD wavelength.

The first beam is transmitted through quarter wave plate, stopped by aperture 14 and focused by objective lens 16 to a spot on the disk 10. The reflected beam is transmitted back to the LDGU 2 in the return path, where the data, focus error and tracking error signals are detected. The objective lens 16 is driven by servo signals derived from the focus error signal to maintain the focussed state of the spot on the optical disk 10.

Figure 3:
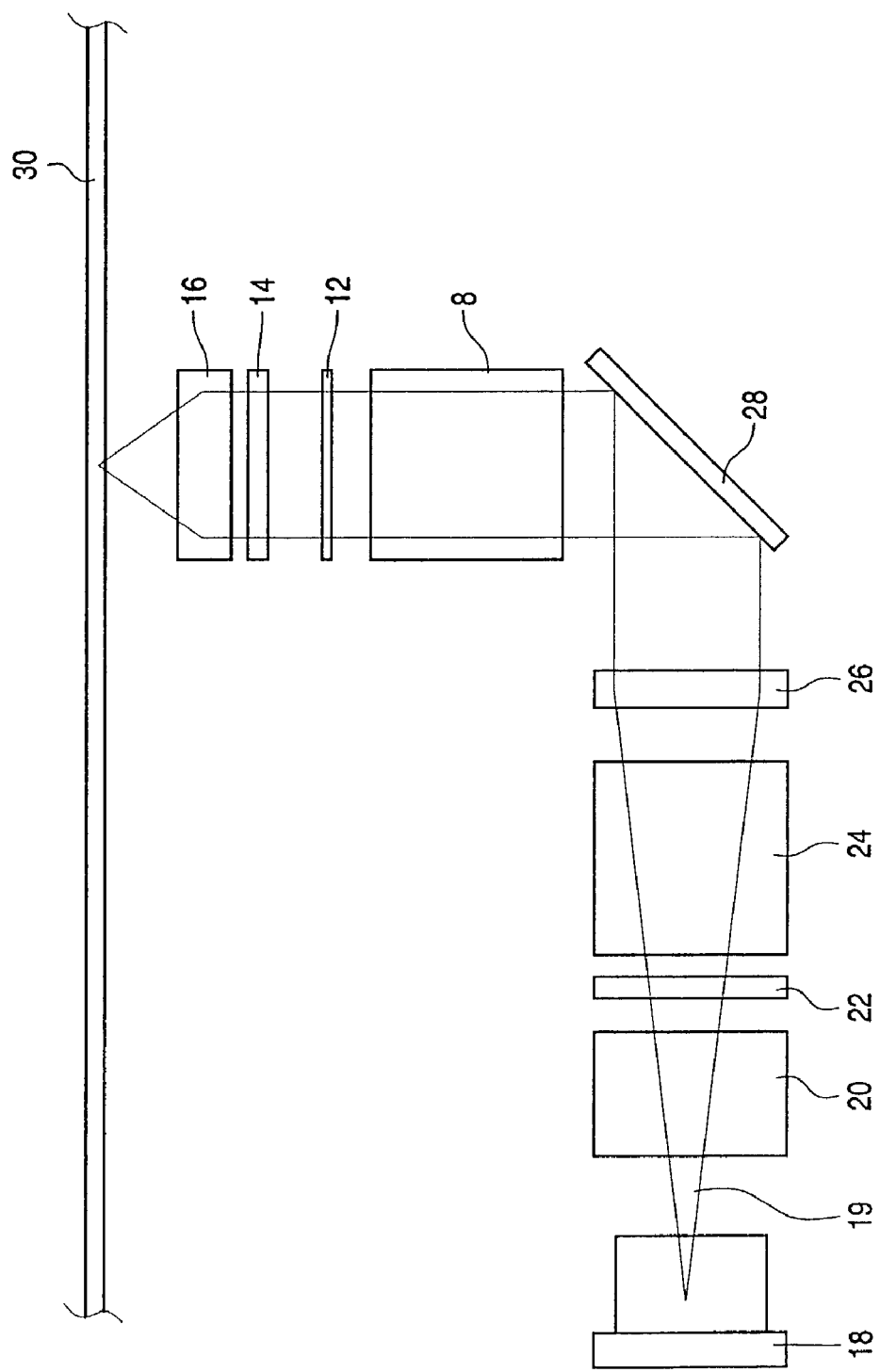
FIG. 3 is a schematic side view perpendicular to that shown in FIG. 2.

Reference is now made to FIGS. 1 and 3. The second optical branch, which is arranged in a single planar layer parallel to the optical disk scanning area and spaced further from the scanning area than the first optical branch, in this embodiment includes a polarised radiation source 18, for example a semiconductor laser, operating at a predetermined wavelength different to that of the first beam, in this example the DVD wavelength, to produce a second beam 19. The optical path for the second beam includes, arranged along a second linear optical path portion along with the source 18, a beam shaper 20 for correcting ellipticity in the emitted beam, a holographic grating 22 for splitting the second beam for focus and radial tracking error signal generation at a detector array 34, a polarising beam splitter 24 for reflecting the reflected second beam towards the detector array, a collimator lens 26 for substantially collimating the second beam, and a folding mirror 28 for reflecting the second beam through 90° to be directed in the axial direction of the optical disk 30 and towards the optical disk 30, which is a disk designed to operate at the DVD wavelength. The second beam is transmitted substantially fully by the dichroic mirror 8, is altered in polarisation from linear to circular polarisation by quarter wave plate 12, is transmitted by aperture 14 and focused to a spot on an information layer in the disk 30. The reflected beam follows a return path, being transformed back to a beam exhibiting linear polarisation perpendicular to the incident beam by the quarter wave plate 12, and is reflected by beam splitter 24 along a third linear optical path portion towards detector lens 32, which focuses the reflected beam towards a photodiode detector array arranged on detector substrate 34, at which a data signal and tracking and focus error signals are detected. The objective lens 16 is driven by servo signals derived from the focus error signal to maintain the focussed state of the spot on the optical disk 10 and the detector array.

The OPU further comprises a tilt sensor unit 36 for detecting tilt of the disk relative to the optical axis of the optical scanning system, and for generating a tilt error signal which may be used in correcting the readout or write characteristics of the device to compensate for different levels of detected tilt during the scanning of the disk. The tilt sensor may be any of a number of known tilt sensors, such as that described United States patent publication U.S. Pat. No. 6,243,337. The tilt sensor is located to the same side of the second optical path portion as the first and third optical path portions.

In the arrangement shown, the first branch operates in a finite conjugate mode, with the first beam remaining in a diverging state when incident upon the objective lens. In this way, spherical aberration correction may be produced in the unit for the first branch to compensate for different information layer depths in the respective formats of disk to be scanned. Since the first branch is arranged between the second branch and the scanning area, additional astigmatism in the first beam, which would be created if the beam were passed in its incident divergent and reflected convergent states through an obliquely arranged dichroic beam splitter similar to that used in the first branch, is in this embodiment avoided.

In one embodiment of the invention, both branches of the OPU are mounted in a single rigid housing, for example of moulded aluminium or suchlike. In an alternative embodiment, the LDGU and the first collimator lens are arranged in a separate rigid housing, again of moulded aluminium or suchlike, which is mounted to a main rigid housing, also of moulded aluminium or suchlike, containing the remaining components of the OPU. In this way the elements of the first branch may be replaced, in a modular fashion. For example, in one embodiment, the elements of the first branch include only components suitable for the read out of data from an optical disk, whereas in another embodiment, in which those components are replaced by a different module, the elements of the first branch include components suitable for the read out of data from and the writing of data to an optical disk.

In the above-described embodiments, the first and second branches are arranged perpendicularly when viewed in the axial direction of the disk. However, the size reduction characteristics, and other advantages including the provision of space for the tilt sensor, provided by use of the present invention are not restricted to an arrangement in which the branches are exactly perpendicular. The branches may for example be arranged ±20° from the perpendicular. However, the branches are preferably arranged within ±5°, more preferably within ±1°, from the perpendicular.

The above embodiments are to be understood as illustrative examples of the invention. Further embodiments of the invention are envisaged. It is to be understood that any feature described in relation to one embodiment may also be used in other of the embodiments. Furthermore, equivalents and modifications not described above may also be employed without departing from the scope of the invention, which is defined in the accompanying claims.

The invention claimed is:

1. An optical unit for scanning an optical disk using a radiation beam directed in a direction axial of said disk when said disk is arranged in a substantially planar scanning area adjacent the unit, the unit comprising:
   a. a first optical branch including a first radiation source (2) for emitting a first radiation beam comprising a first wavelength, and a first reflective element (8) located in the path of the first radiation beam for reflecting the first beam towards said scanning area in said axial direction, the unit being arranged such that said first beam is directed along a first linear optical path portion when incident from said first radiation source upon said first reflective element; and
   b. a second optical branch including a second radiation source (18) for emitting a second radiation beam comprising a second wavelength, different from said first wavelength, and a second reflective element (28) located in the path of the second radiation beam for reflecting the second beam towards said scanning area in said axial direction, the unit being arranged such that said second beam, is directed along a second linear path portion when incident from said second radiation source upon said second reflective element,
   wherein said first reflective element is arranged between said second reflective element and said scanning area such that said first and second branches are stacked in said axial direction, and
   wherein said first and second optical path portions are arranged substantially perpendicularly to each other and to said axial direction.

2. An optical unit according to claim 1, wherein said second branch includes a third linear optical path portion arranged substantially perpendicularly to said second optical path portion when viewed along said axial direction, said first and third optical path portions being arranged to the same side of said second optical path portion.

3. An optical unit according to claim 2, wherein said unit includes a radiation detector array arranged along said third optical path portion.

4. An optical unit according to claim 1, wherein said first radiation source is arranged along said first optical path portion.

5. An optical unit according to claim 1, wherein said second radiation source is arranged along said second optical path portion.

6. An optical unit according to claim 1, wherein said first optical branch comprises one or more optical components mounted in a first housing and said second optical branch comprises one or more optical components mounted in an independently formed second housing.

7. An optical unit according to claim 1, further comprising a tilt sensor arranged adjacent to said second optical path portion.

8. An optical unit according to claim 1, wherein said first branch is arranged in a finite conjugate optical arrangement.

9. An optical recording and/or playback device comprising an optical unit according to claim 1.

10. An optical unit for scanning an optical disk using a radiation beam directed in a direction axial of said disk when said disk is arranged in a substantially planar scanning area adjacent the unit, the unit comprising:
    c. a first optical branch including a first radiation source (2) for emitting a first radiation beam comprising a first wavelength, and a first reflective element (8) located in the path of the first radiation beam for reflecting the first beam towards said scanning area in said axial direction, the unit being arranged such that said first beam is directed along a first linear optical path portion when incident front said first radiation source upon said first reflective element; and
    d. a second optical branch including a second radiation source (18) for emitting a second radiation beam comprising a second wavelength, different from said first wavelength, and a second reflective element (28) located in the path of the second radiation beam for reflecting the second beam towards said scanning area in said axial direction, the unit being arranged such that said second beam, is directed along a second linear path portion when incident from said second radiation source upon said second reflective element,
    wherein said first reflective element is arranged between said second reflective element and said scanning area such that said first and second branches are stacked in said axial direction,
    wherein said first and second optical path portions are arranged substantially perpendicularly when viewed along said axial direction, and
    wherein said first and second branches are arranged in respective planar layers.

11. An optical unit for scanning an optical disk using a radiation beam directed in a direction axial to said disk when said disk is arranged in a substantially planar scanning area adjacent the unit, the unit comprising:
    a first optical branch including
        a first radiation source for emitting a first radiation beam comprising a first wavelength, and
        a first reflective element (8) located in the path of the first radiation beam for reflecting the first beam towards said scanning area in said axial direction,
        the first optical branch being arranged such that said first beam, when incident from said first radiation source upon said first reflective element, is traveling along a first linear optical path portion; and
    a second optical branch including
        a second radiation source (18) for emitting a second radiation beam comprising a second wavelength, different from said first wavelength, and
        a second reflective element (28) located in the path of the second radiation beam for reflecting the second beam towards said scanning area in said axial direction,
        the second optical branch being arranged such that said second beam, when incident from said second radiation source upon said second reflective element, is travelling along a second linear optical path portion, wherein
said first reflective element and said second reflective element are stacked along a common optical path portion arranged in said axial direction, the first reflective element being arranged between said second reflective element and said scanning area, and said first and second optical path portions and said axial direction are arranged so that no plane can be found that includes all three.

12. The unit of claim 11, wherein said second branch includes a third linear optical path portion arranged substantially perpendicularly to said second optical path portion when viewed along said axial direction, said first and third optical path portions being arranged to the same side of said second optical path portion.

13. An optical recording and/or playback device comprising an optical unit according to claim 12.

14. An optical recording and/or playback device comprising an optical unit according to claim 11.

15. An optical unit for scanning an optical disk using a radiation beam directed in a direction axial to said disk when said disk is arranged in a substantially planar scanning area adjacent the unit, the unit comprising:
a first optical branch including
a first radiation source for emitting a first radiation beam comprising a first wavelength, and
a first reflective element (8) located in the path of the first radiation beam for reflecting the beam towards said scanning area in said axial direction,
the first optical branch being arranged such that said first beam, when incident from said first radiation source upon said first reflective element, is traveling along a first linear optical path portion; and
a second optical branch including
a second radiation source (18) for emitting a second radiation beam comprising a second wavelength, different from said first wavelength, and
a second reflective element (28) located in the path of the second radiation beam for reflecting the second beam towards said scanning area in said axial direction,
the second optical branch being arranged such that said second beam, when incident from said second radiation source upon said second reflective element, is travelling along a second linear optical path portion,
wherein
said first reflective element and said second reflective element are stacked along a common optical path portion arranged in said axial direction, the first reflective element being arranged between said second reflective element and said scanning area, and said first and second optical path portions are substantially perpendicular to each other when viewed along the axial direction
wherein the axial direction is perpendicular to both the first and second optical path portions.

16. An optical recording and/or playback device comprising an optical unit according to claim 15.

* * * * *